United States Patent Office

2,883,427
Patented Apr. 21, 1959

2,883,427

MANUFACTURE OF DIPHENYLMETHYL HYDROPEROXIDE

Dexter B. Sharp and Bernard S. Wildi, Dayton, Ohio, assignors to Monsanto Chemical Company, St. Louis, Mo., a corporation of Delaware No Drawing. Application September 22, 1954
Serial No. 457,784

10 Claims. (Cl. 260—610)

This invention relates to the manufacture of diphenylmethyl hydroperoxide. In one aspect the invention relates to a method of subjecting diphenylmethane to direct oxidation with molecular oxygen under conditions resulting in good conversions and yields of diphenylmethyl hydroperoxide.

Several attempts at the direct oxidation of diphenylmethane, which has the formula $C_6H_5CH_2C_6H_5$, have been reported in the literature. Stephens and Roduta, Jour. Amer. Chem. Soc., 57, 2380 (1935), treated diphenylmethane with oxygen at 100–119° C., both with and without water, for periods of time of from 2 to 4 weeks. The only reported product was benzophenone (diphenyl ketone). Larson et al., Ind. Eng. Chem., 34, 190 (1942) later reported that benzaldehyde was a product of diphenylmethane oxidation at 110° C. Data reported by the latter workers showed diphenylmethane to be unique among various hydrocarbons whose oxidation they attempted, in that the oxidation was able to go only to a slight extent after which it was apparently completely inhibited. Larson et al. stated that diphenylmethane when undergoing oxidation apparently produces an auto-inhibitor for the oxidation. The first reported isolation of diphenylmethyl hydroperoxide, having the formula $C_6H_5CHOOHC_6H_5$, from the oxidation of diphenylmethane, was by Hock and Lang, Ber., 77B, 257 (1944). These workers obtained a 2.8 percent conversion to diphenylmethyl hydroperoxide using oxygen at 65° C. for 60 hours with ultraviolet irradiation. Various catalysts have been used in the oxidation of diphenylmethane, resulting in the formation of benzophenone. The large amount of research reported during the past several years on hydroperoxides has emphasized that non-tertiary hydroperoxides, i.e., those wherein the —OOH group is attached to a non-tertiary carbon atom, are much less stable towards heat than the tertiary hydroperoxides. All of the foregoing therefore naturally points to the conclusion that diphenylmethyl hydroperoxide cannot be effectively made by simple direct oxidation of diphenylmethane.

An object of this invention is to produce diphenylmethyl hydroperoxide. Another object is to provide a method of obtaining diphenylmethyl hydroperoxide directly from diphenylmethane. A further object is to provide conditions of reaction whereby diphenylmethane can be subjected to direct oxidation with molecular oxygen resulting in formation of diphenylmethyl hydroperoxide in good yields. A further object is to make possible the formation of diphenylmethyl hydroperoxide from diphenylmethane with a shortened reaction period. Further objects and advantages of the invention will be apparent to one skilled in the art from the accompanying disclosure and discussion.

In accordance with preferred embodiments of the present invention, diphenylmethane is subjected to the action of molecular oxygen, i.e., pure oxygen or gases containing oxygen, e.g. air, at temperatures within the range of 140° C. to 180° C. for periods of time not exceeding about 3 hours. The preferred procedure is to effect an intimate admixture of liquid diphenylmethane with air or other gas comprising molecular oxygen at the stated conditions. Preferably a temperature of about 160° C. is used. At this temperature a maximum content of diphenylmethyl hydroperoxide is obtained in a reaction period of approximately 1 hour. The oxidation is deliberately stopped before or at the time the maximum diphenylmethyl hydroperoxide content of the reaction mixture is reached. By effecting the oxidation of diphenylmethane as described herein, conversions of diphenylmethane within the range of 15 to 20 weight percent diphenylmethane converted to diphenylmethyl hydroperoxide are obtainable, with ultimate yields, i.e., mole percent diphenylmethyl hydroperoxide obtained based upon diphenylmethane destroyed, in the neighborhood of 50 percent, when stopping the reaction at the point of maximum hydroperoxide content. Still higher yields are obtained by stopping the reaction short of the maximum, for example when the diphenylmethyl hydroperoxide content of the reaction mixture has reached only 10 weight percent or less.

While the oxidation is best carried out at a temperature of at least 140° C., some of the benefits of the invention are obtained at temperatures on down to 125° C. However, at 125° C. a reaction time in the neighborhood of 10 hours is required to reach maximum diphenylmethyl hydroperoxide content. Temperatures of 200° C. and higher can be used, though the maximum conversion and yield are apt to be less than when operating in the preferred range of 140° C. to 180° C. At 200° C., 30 minutes or less is sufficient time to reach maximum content of diphenylmethyl hydroperoxide in the reaction mixture. Adequate heat removal capacity must be provided in the system in any event, and this is especially important when the reaction is effected extremely rapidly at temperatures above 180° C.

The reaction can be effected by bubbling air, for example, through liquid diphenylmethane held in a glass or metal reaction vessel at the desired temperature. Preferably such a vessel is equipped with a reflux condenser to minimize losses in effluent vapors. Such vapors can be diluted with steam or inert gas to minimize explosion hazards. The reaction can be carried out at atmospheric pressure, or superatmospheric pressures, for example from 50 to 500 pounds per square inch, are suitable. Alternatively, an entirely closed system can be used, with sufficient pure oxygen, air, or other gas containing molecular oxygen being introduced at the start, or over a period of time, to provide the required oxygen for the reaction. In any event, it is of course desirable to obtain an intimate admixture of oxygen with the liquid reaction mixture as by vigorous stirring, shaking, passing fine bubbles of gas through liquid reaction mixture, flowing a mixture of diphenylmethane and oxygen turbulently through a tubular reactor, or the like, as will be well understood by those skilled in the art. Suitable means should be provided for removing the exothermic heat of reaction, and for avoiding the presence of local hot spots. The quantity of molecular oxygen employed will of course depend to a considerable extent upon the particular apparatus used. Oxygen in an amount insufficient to react with all of the diphenylmethane present can be used, or appreciable excesses of oxygen are also permissible, especially where the gas is being continuously passed through a body of liquid reaction mixture.

Those skilled in the art will appreciate that the usual precautions should be taken in view of the fact that mixtures of hydrocarbon and oxygen are involved, and in view of the known tendency of hydroperoxides to undergo violent decomposition on occasion. Thus, for example one oxidation of diphenylmethane being carried out with oxygen at 160° C. in the presence of sodium bicarbonate under atmospheric pressure resulted in a violent vapor phase explosion. The liquid phase did not explode or burn. The cause of the explosion was unknown. However, it illustrates the fact that adequate protection for personnel and equipment should be provided in known manner. Pressure rupture disks should be used in closed reaction systems, and the reactor in all cases should be shielded.

Ordinarily the oxidation is effected with diphenylmethane and molecular oxygen as the sole reactive constituents of the initial reaction mixture. Addition of a small quantity of diphenylmethyl hydroperoxide or other peroxide, or other initiator, e.g. ethyl acetoacetate, phenylacetone, acetylacetone, at the start of the reaction is permissible, but not required, as little or no induction period is exhibited. Inert solvents can be present to aid in temperature control, but care should be taken that solvents are not employed that tend to accelerate the rate of decomposition of the diphenylmethyl hydroperoxide product. For example, ordinary benzene containing some thiophene is not suitable as the thiophene contained therein apparently greatly accelerates the decomposition of diphenylmethyl hydroperoxide. As permissible solvents can be mentioned thiophene-free benzene, toluene, acetic anhydride, etc., but it should be noted that these materials generally tend to decrease the rate of formation of diphenylmethyl hydroperoxide. Basic materials, preferably alkali metal carbonates and alkaline earth metal carbonates and oxides (the term "carbonates" includes bicarbonates when the latter exist), for example sodium carbonate, sodium bicarbonate, calcium carbonate, calcium oxide, have a generally favorable effect in that color formation is minimized. Suitable quantities include the range of 0.5 to 10 weight percent based on diphenylmethane. These basic materials in general do not aid the rate of formation of diphenylmethyl hydroperoxide, but in some instances the ultimate yield is somewhat increased. Some of the value of calcium oxide, for example, may be attributed to removal of water formed during the reaction. It can also be noted that water can be trapped out of condensed vapors being refluxed and returned to the liquid reaction mixture, thereby removing water from the system.

Metallic oxidation catalysts, such as cobalt or manganese salts, e.g. cobalt naphthenates, should not be present in the reaction mixture or the oxidation will produce benzophenone and other oxidation products and not the desired hydroperoxide.

The following examples provide detailed information on various preferred embodiments of the present invention, and illustrate results obtainable under differing conditions of reaction. However, it will be appreciated that these data are given by way of illustration and that various other combinations of reaction conditions and procedures can be employed without departing from the invention.

EXAMPLE 1

Oxidation of diphenylmethane was effected in a vertical cylindrical glass reactor equipped with a liquid inlet, a reflux condenser, a thermometer well, a gas inlet tube, a stirrer, the paddle of which was immediately adjacent the gas inlet in the liquid reaction mixture, and an outlet for collecting liquid samples for analyses. A series of oxidations was carried out to demonstrate the effect of temperature and time upon the maximum diphenylmethyl hydroperoxide value. In each instance the charge to the reactor was 100 grams of diphenylmethane, with no initiator or other additive being present. Oxygen gas was passed into the liquid in a continuous stream.

Analyses for hydroperoxide content were made periodically by withdrawing small samples and analyzing by the iodimetric method of Wagner et al., Analytical Chemistry, 19, 974 (1947). The final benzophenone content of each mixture was estimated from infrared absorption spectra.

Runs were made at 140° C., 150° C., 160° C., 170° C. and 180° C. The data obtained from these runs are summarized in Table I as mole percent conversion to diphenylmethyl hydroperoxide as the maximum hydroperoxide content of the reaction mixture and the time at which that maximum value occurred, percent conversion to hydroperoxide in the final mixture, and percent conversion to benzophenone in the final mixture.

Additionally, data for the runs at 140° C., 160° C., and 180° C. are given in detail in Table II as weight percent diphenylmethyl hydroperoxide in the reaction mixture as a function of time. Data for the runs at 150° C. and 170° C. gave values intermediate between the runs made at the 10° higher and lower temperature, respectively.

Oxidation of diphenylmethane in the same manner but at 120° C., with diphenylmethyl hydroperoxide added as initiator, required 12 to 16 hours to reach maximum conversion (14.9 mole percent) to disphenylmethyl hydroperoxide.

*Table I.—Oxidation of diphenylmethane effect of temperature and time*

| Run | Temp. ° C. | Time (Hrs.) | | Conversion to Diphenylmethyl Hydroperoxide, Mole Percent | | Conversion to Benzophenone, Mole Percent—Final |
|---|---|---|---|---|---|---|
| | | At Max. | Total | At Max. | Final | |
| A | 140 | 3.25 | 6.0 | 14.7 | 8.4 | 14.0 |
| B | 150 | 1.5 | 6.0 | 14.5 | 3.8 | 18.5 |
| C | 160 | 1.25 | 6.0 | 17.2 | 1.9 | 28.0 |
| D | 170 | 0.92 | 2.25 | 15.1 | 7.5 | 17.8 |
| E | 180 | 0.67 | 1.5 | 14.9 | 5.5 | 25.1 |

*Table II.—Oxidation of diphenylmethane effect of temperature and time*

| Time From Start of Reaction | | Content of Diphenylmethyl Hydroperoxide, Wt. Percent | | |
|---|---|---|---|---|
| Hours | Minutes | 140° C. | 160° C. | 180° C. |
| | 10 | | | 6.7 |
| | 15 | | 5.8 | |
| | 20 | | | 15.1 |
| | 30 | 2.4 | 11.2 | 16.7 |
| | 40 | | | 17.7 |
| | 45 | | 15.4 | |
| | 50 | | | 13.3 |
| 1 | 0 | 6.4 | 19.7 | 11.2 |
| 1 | 10 | | | 8.0 |
| 1 | 15 | | 20.5 | |
| 1 | 30 | 10.5 | 19.1 | 6.4 |
| 1 | 45 | | 19.5 | |
| 2 | 0 | 13.5 | 17.9 | |
| 2 | 15 | | 14.8 | |
| 2 | 30 | 16.7 | 13.6 | |
| 3 | 15 | 17.6 | 9.2 | |
| 4 | 5 | 16.6 | | |
| 4 | 30 | 16.1 | 5.3 | |
| 5 | 0 | 14.9 | | |
| 6 | 0 | 9.9 | 2.3 | |

EXAMPLE 2

Oxidations of 100 grams of diphenylmethane were carried out at 160° C. in the manner described in Example 1, but with the addition of 3.4 grams of sodium bicarbonate in one instance and 2.0 grams of freshly calcined calcium oxide in another instance. Periodic analyses for hydroperoxide content were made. Data are presented in Table III.

*Table III.—Oxidation of diphenylmethane in the presence of basic substances*

| Time From Start of Reaction, Hours | Content of Diphenylmethyl Hydroperoxide, Wt. Percent | |
|---|---|---|
| | NaHCO₃ | CaO |
| 0.25 | 0.9 | 3.2 |
| 0.5 | 3.8 | 8.4 |
| 0.75 | 8.5 | 13.9 |
| 1.0 | 11.9 | 18.4 |
| 1.25 | 15.8 | 19.3 |
| 1.5 | 16.9 | 20.8 |
| 1.75 | 17.1 | 19.0 |
| 2.0 | 16.2 | 18.0 |
| 2.25 | 16.0 | |

EXAMPLE 3

Diphenylmethane (100 grams) was oxidized at 160° C. with oxygen for 55 minutes, in the apparatus and by the procedure described in Example 1. The final mixture contained 17.6 weight percent hydroperoxide, which is a 15.0 mole percent conversion.

The mixture was diluted with 100 ml. of diethyl ether, extracted with nine 15-ml. portions of 25 percent sodium hydroxide to remove the hydroperoxide, two 25-ml. portions of water, and five 20-ml. portions of saturated sodium chloride solution. Distillation of the extracted solution resulted in the recovery of 63.2 grams of diphenylmethane having a boiling range of 82° C. to 86° C. at 0.6 mm. Hg. Based on this recovery of unreacted hydrocarbon the yield of diphenylmethyl hydroperoxide at the end of the oxidation was 40 mole percent.

While the invention has been described with particular reference to various preferred embodiments thereof, it will be appreciated that numerous modifications and variations are possible without departing from the invention.

We claim:

1. A process which comprises oxidizing diphenylmethane with molecular oxygen at a temperature within the range of 140° C. to 180° C. for a period of time not exceeding about 3 hours to produce diphenylmethyl hydroperoxide.

2. A process which comprises oxidizing diphenylmethane with molecular oxygen at a temperature of at least 125° C. but not so high as to prevent the production and recovery of diphenylmethyl hydroperoxide product, for a period of time not in excess of that required to produce maximum diphenylmethyl hydroperoxide content in the reaction mixture.

3. A process which comprises oxidizing diphenylmethane with molecular oxygen at a temperature of about 160° C. for a period of time within the range of 1 to 2 hours limited to produce maximum diphenylmethyl hydroperoxide content in the reaction mixture.

4. A process which comprises oxidizing diphenylmethane with molecular oxygen at a temperature of about 180° C. for a period of time less than 1 hour limited to produce maximum diphenylmethyl hydroperoxide content in the reaction mixture.

5. A process which comprises intimately contacting liquid diphenylmethane with molecular oxygen at a temperature within the range of 140° C. to 180° C. for a period of time not exceeding about 3 hours, the greater the temperature the shorter the time, and stopping the oxidation when maximum diphenylmethyl hydroperoxide content for the chosen temperature has been attained in the reaction mixture.

6. A process according to claim 5 wherein said molecular oxygen is present in the form of air.

7. A process according to claim 5 wherein said molecular oxygen is present in the form of essentially pure oxygen gas.

8. A process which comprises oxidizing diphenylmethane with molecular oxygen in the presence of an alkaline material selected from the group consisting of the alkali metal carbonates and the alkaline earth metal carbonates and oxides, at a temperature within the range of 140° C. to 180° C. for a period of time not exceeding about 3 hours to produce diphenylmethyl hydroperoxide.

9. A process which comprises intimately contacting liquid diphenylmethane containing calcium oxide with a gas comprising molecular oxygen at a temperature within the range of 140° C. to 180° C. for a period of time not exceeding about 3 hours, the greater the temperature the shorter the time, and stopping the oxidation when maximum diphenylmethyl hydroperoxide content for the chosen temperature has been attained in the reaction mixture.

10. A process which comprises oxidizing diphenylmethane with molecular oxygen at a temperature within the range of 125° C. to 200° C. for a period of time less than that required to produce maximum diphenylmethyl hydroperoxide content in the reaction mixture, and recovering diphenylmethyl hydroperoxide from the reaction mixture.

References Cited in the file of this patent

UNITED STATES PATENTS

| 2,535,344 | Bishop et al. | Dec. 26, 1950 |
| 2,632,733 | Armstrong et al. | Mar. 24, 1953 |

FOREIGN PATENTS

| 520,588 | Belgium | June 20, 1953 |
| 146,221 | Sweden | July 20, 1954 |
| 726,362 | Great Britain | Mar. 16, 1955 |

OTHER REFERENCES

Hock et al.: Ber. Deut. Chem., vol. 77B, pp. 257–64 (1944).